United States Patent
Garces (10) Patent No.: US 10,963,689 B2
(45) Date of Patent: Mar. 30, 2021

(54) IMAGE PROCESSING APPARATUS AND METHOD FOR CONTROLLING IMAGE PROCESSING APPARATUS

(71) Applicant: KYOCERA Document Solutions Inc., Osaka (JP)

(72) Inventor: Patricia Ysabel Garces, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 113 days.

(21) Appl. No.: 16/390,872

(22) Filed: Apr. 22, 2019

(65) Prior Publication Data

US 2019/0347480 A1   Nov. 14, 2019

(30) Foreign Application Priority Data

May 11, 2018   (JP) .............................. JP2018-092214

(51) Int. Cl.
   *G06K 9/00*   (2006.01)
   *H04N 1/00*   (2006.01)
   *G06K 9/20*   (2006.01)

(52) U.S. Cl.
   CPC ....... *G06K 9/00456* (2013.01); *G06K 9/2063* (2013.01); *H04N 1/00167* (2013.01)

(58) Field of Classification Search
   None
   See application file for complete search history.

(56) References Cited

U.S. PATENT DOCUMENTS

2006/0008177 A1* 1/2006 Chermont ............... G06T 11/60
                                                        382/284
2013/0343639 A1* 12/2013 Benko ..................... G06T 11/60
                                                        382/155

FOREIGN PATENT DOCUMENTS

JP            6-332432 A      12/1994

* cited by examiner

*Primary Examiner* — Wei Wen Yang
(74) *Attorney, Agent, or Firm* — Stein IP, LLC (57) ABSTRACT

An image processing apparatus includes a control portion and an output portion. The control portion sets a letter included in a document as a target letter, and performs connection processing of connecting the target letter and a next letter to each other with a connection line without changing the font of the target letter and without changing the font of the next letter, the next letter being a letter positioned immediately after the target letter in order of alignment in a writing direction. The output portion outputs the document after the connection processing is performed on the document.

5 Claims, 11 Drawing Sheets

CONNECTION PROCESSING

IMAGE PROCESSING APPARATUS AND METHOD FOR CONTROLLING IMAGE PROCESSING APPARATUS

INCORPORATION BY REFERENCE

This application is based upon and claims the benefit of priority from the corresponding Japanese Patent Application No. 2018-092214 filed on May 11, 2018, the entire contents of which are incorporated herein by reference.

BACKGROUND

The present disclosure relates to an image processing apparatus and a method for controlling the image processing apparatus.

Conventionally, personal computers, image forming apparatuses, and so forth have been known as image processing apparatuses. These image processing apparatus are capable of outputting a document created by using word-processing software or the like. The conventional image processing apparatuses perform displaying, printing, etc. of the document.

For example, the conventional image processing apparatuses are provided with a function of converting the font of a letter in the document from the original font to a handwriting font (a script font). By using this function, it is possible to convert the letters in the document into handwritten-style letters (that is, it is possible to naturally connect two adjacent letters to each other).

SUMMARY

According to a first aspect of the present disclosure, an image processing apparatus includes a control portion and an output portion. The control portion sets a letter included in a document as a target letter, and performs connection processing of connecting the target letter and a next letter to each other without changing a font of the target letter and without changing a font of the next letter, the next letter being a letter positioned immediately after the target letter in order of alignment in a writing direction. The output portion outputs the document after the connection processing is performed on the document.

According to a second aspect of the present disclosure, a method for controlling an image processing apparatus includes setting a letter included in a document as a target letter to perform connection processing of connecting the target letter and a next letter to each other with a connection line without changing a font of the target letter and without changing a font of the next letter, the next letter being a letter positioned immediately after the target letter in order of alignment in a writing direction, and outputting the document after the connection processing is performed on the document.

DETAILED DESCRIPTION

First Embodiment

Hereinafter, a first embodiment of the present disclosure will be described. The image processing apparatus of the first embodiment is a personal computer (PC).

Figure 1:
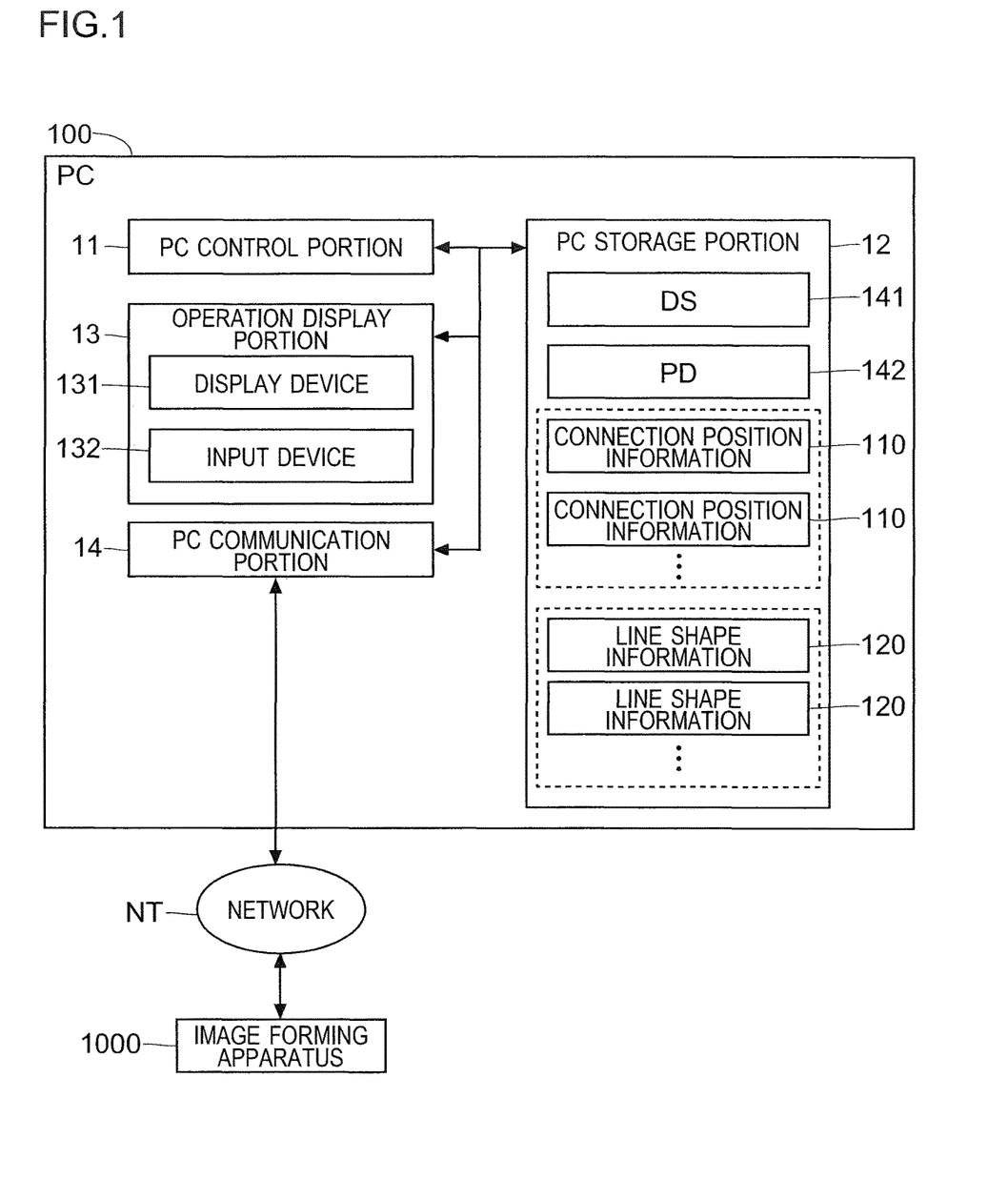
FIG. 1 is a block diagram showing a configuration of an image processing apparatus (a personal computer) according to a first embodiment of the present disclosure.

As shown in FIG. 1, a PC 100 of the first embodiment includes a PC control portion 11, a PC storage portion 12, an operation display portion 13, and a PC communication portion 14. In the first embodiment, the PC control portion 11 corresponds to "a control portion" and the PC storage portion 12 corresponds to "a storage portion".

The PC control portion 11 includes a CPU. The PC control portion 11 performs the overall control of the PC 100 based on a control program and control data.

The PC storage portion 12 includes storage devices such as a ROM, a RAM, and an HDD. The PC storage portion 12 stores therein the control program and the control data. The PC storage portion 12 is connected to the PC control portion 11. The PC control portion 11 writes information to, and reads information from, the PC storage portion 12.

The operation display portion 13 includes a display device 131 and an input device 132. The display device 131 is a liquid crystal display, for example. It is also possible to use another type of display, such as an organic electroluminescence display, as the display device 131. The input device 132 is, for example, a hardware key board, a pointing device, etc.

The display device 131 displays a document created by word processing software or the like. There is no particular limitation to the format of font data for letters in a document. The data format may be a bitmap font format, or may be a scalable font format. There are two kinds of scalable font formats, namely, an outline font format and a stroke font format. The input device 132 accepts requests, instructions, and settings, for example, from a user.

The PC communication portion 14 is an interface for connecting the PC 100 to a network NT, such as a LAN, the Internet, etc. The PC communication portion 14 includes a communication circuit, a communication memory, a communication connector, etc. To the network NT, there is connected, for example, an image forming apparatus 1000, which is a printer, a multifunction peripheral, or the like.

The PC communication portion 14 is connected to the PC control portion 11. The PC control portion 11 accesses the network NT by using the PC communication portion 14 to communicate with the image forming apparatus 1000.

Here, the PC 100 has installed therein document creating software 141 (hereinafter referred to as the DS 141) such as word processing software, spreadsheet software, etc. The PC 100 also has installed therein a printer driver 142 (hereinafter referred to as the PD 142). The DS 141 and the PD 142 are stored in the PC storage portion 12.

With the DS 141 installed in the PC 100, the user can create a document by using the PC 100. Furthermore, with the PD 142 installed in the PC 100, the user can make the image forming apparatus 1000 perform the printing of the document that he/she has created by using the PC 100.

When the operation display portion 13 accepts from the user an instruction to activate the DS 141, the PC control portion 11 activates the DS 141. When the DS 141 is activated, a document creation screen (not shown) for creating documents is displayed on the operation display portion 13. In this state, the operation display portion 13 accepts input of letters from the user. The user can input letters (to create a document including the letters) by operating the input device 132 (the hardware keyboard). The display device 131 displays the document including the letters that the user has inputted. In other words, the display device 131 outputs the document including the letters.

Here, the DS 141 is provided with a function (hereinafter referred to as the letter connecting function) of converting letters in a document displayed on the display device 131 into handwritten-style letters. By using the letter connecting function, it is possible to connect two adjacent letters in the document with a line (hereinafter referred to as a connection line) without changing the font (the typeface) of each letter in a document. That is, it is possible to convert letters in a document into handwritten-style letters.

For example, although not shown, the PC control portion 11 makes the display device 131 display a letter setting icon. On detecting an operation performed via the input device 132 with respect to the letter setting icon (for example, an operation of placing a pointer on the letter setting icon and clicking on the icon), the PC control portion 11 makes the display device 131 popup-display a dialogue box for accepting, from the user, settings related to letters (letter settings).

The letter settings include a setting for enabling the letter connecting function. Here, in the letter settings, it is also possible to make settings of the font (typeface), the color, the size, the stroke width, etc., of letters. Further, in the letter settings, it is also possible to make the settings for decorations (such as underlines) added to letters.

When a setting is made, via the input device 132, to the effect that the letter connecting function should be enabled, the PC control portion 11 determines that a request for executing processing (hereinafter referred to as the connecting processing) related to the letter connecting function has been accepted. At this time, the PC control portion 11 performs the connection processing on the letters in the currently displayed document.

Here, the PC control portion 11 takes the alphabetical letters as the target of the connection processing, but does not take non-alphabetical letters as the target of the connection processing. That is, the writing direction (the direction in which letters are written), in which letters that are to be the target of the connection processing are written, is the left-to-right direction. The PC control portion 11 does not take letters of a special font (such as a Dingbat font) as the target of the connection processing, either.

Figure 2:
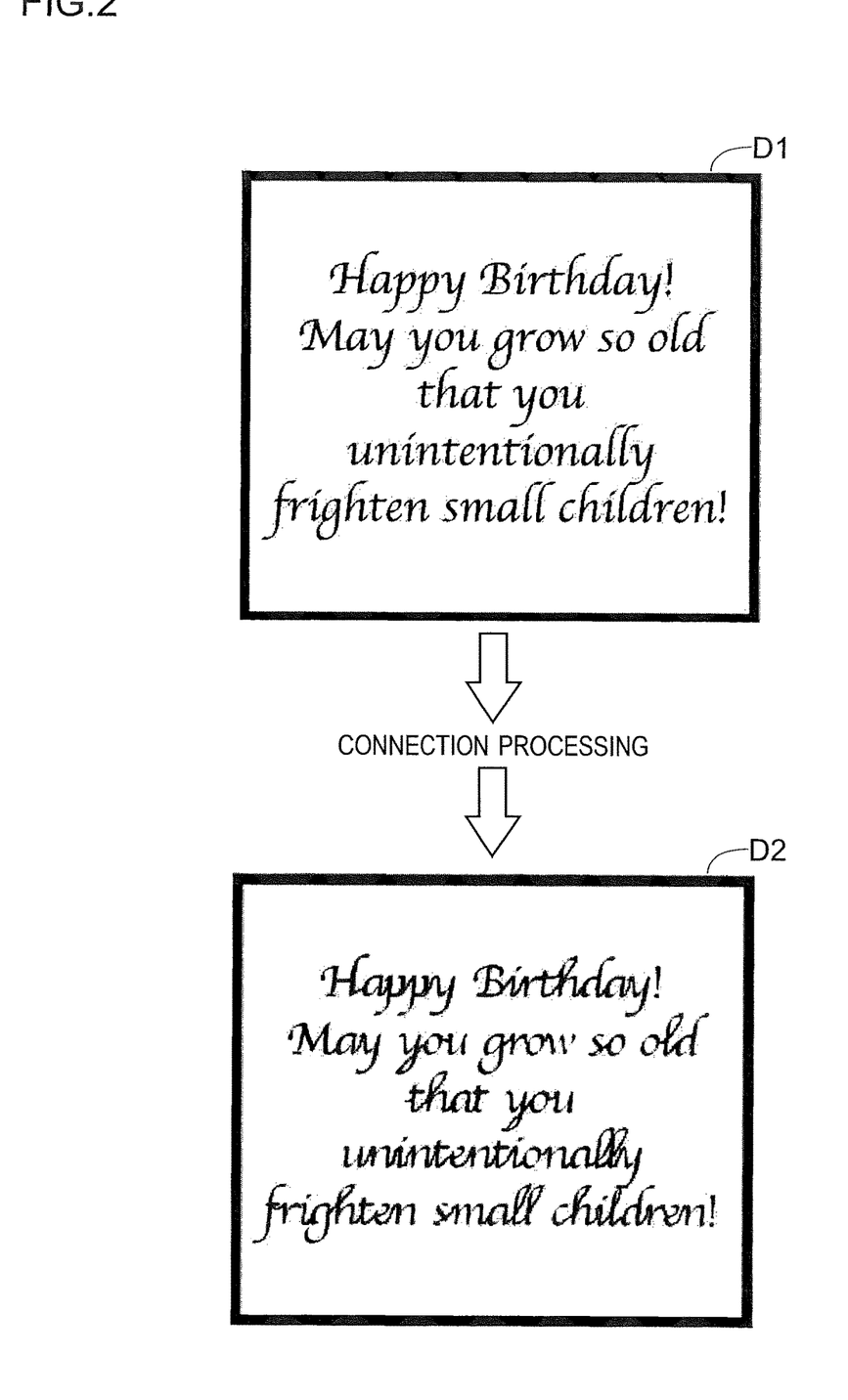
FIG. 2 is a diagram showing documents before and after connection processing is performed thereon by the image processing apparatus according to the first embodiment of the present disclosure.

For example, assume that the user creates a document (here, denoted by sign D1) as shown in the upper diagram of FIG. 2, and that, while the document D1 is displayed, the user makes a setting to the effect that the letter connecting function should be enabled. Here, since the letters in the document D1 are alphabetical letters, the connection processing is performed by the PC control portion 11 on the letters in the document D1 as the target. As a result, a document (here, denoted by sign D2) as shown in the lower diagram of FIG. 2 is displayed. It is also possible to make the image forming apparatus 1000 execute the printing of the document D2 by transmitting, to the image forming apparatus 1000, printing data for printing the document D2.

Hereinafter, with reference to the flow chart shown in FIG. 3, a description will be given of the flow of the processing performed by the PC control portion 11. In the flow chart shown in FIG. 3, the flow starts when the PC control portion 11 determines that a request for the execution of the connection processing (a setting to the effect that the letter connecting function should be enabled) has been accepted.

In the following description, a document (a currently displayed document) that includes letters to be the target of the connection processing performed by the PC control portion 11 will be referred to as the target document. Here, assume that the target document includes a plurality of letters, of which all are alphabetical letters.

In step S1, the PC control portion 11 sets one of the plurality of letters in the target document as a target letter. In step S2, the PC control portion 11 recognizes the font (an alphabetical font) of the target letter. There are a plurality of kinds of alphabetical fonts, which are classified into three main categories (serif fonts, sans-serif fonts, and script fonts).

In step S3, the PC control portion 11 determines whether or not there is a next letter, which is positioned immediately after the target letter in order of alignment in the writing direction. When, as a result, the PC control portion 11 has determined that there exists a next letter, the flow proceeds to step S4. Here, even when a letter exists positioned after the target letter, if the font of the letter is a special font (such as a Dingbat font), the PC control portion 11 determines that there exists no next letter.

In step S4, the PC control portion 11 determines whether or not predetermined conditions (first and second conditions) are satisfied. At this time, the PC control portion 11 performs a first condition determination processing and a second condition determination processing.

When performing the first condition determination processing, the PC control portion 11 determines whether the next letter is a capital letter or a small letter. When the next letter is a small letter, the PC control portion 11 determines that the first condition is satisfied. On the other hand, when the next letter is a capital letter, the PC control portion 11 determines that the first condition is not satisfied.

When performing the second condition determination processing, the PC control portion 11 determines whether or not there is a mark (hereinafter referred to as a separation mark) that indicates separation between words, or a space, between the target letter and the next letter. When there is neither a separation mark nor a space between the target letter and the next letter, the PC control portion 11 determines that the second condition is satisfied. On the other hand, when there is a separation mark or a space between the target letter and the next letter, the PC control portion 11 determines that the second condition is not satisfied.

When the first and second conditions are both satisfied, the PC control portion 11 determines that the predetermined conditions are satisfied. On the other hand, when at least one of the first condition and the second condition is not satisfied, the PC control portion 11 determines that the predetermined conditions are not satisfied.

When, in step S4, the PC control portion 11 determines that the predetermined conditions are satisfied, the flow proceeds to step S5. In step S5, the PC control portion 11 performs connection position setting processing. At this time, the PC control portion 11 refers to connection position information 110. The connection position information 110 is stored in the PC storage portion 12 (see FIG. 1)

The connection position information 110 defines, with respect to each letter of a plurality of kinds of letters, a connection position (hereinafter referred to as the first position) for connecting, to the each letter, a connection line that is connected to a letter positioned immediately after the each letter in order of alignment in the writing direction and a connection position (hereinafter referred to as the second position) for connecting, to the each letter, a connection line that is connected to a letter positioned immediately before the each letter in order of alignment in the writing direction. The connection position information 110 is stored in the PC storage portion 12 for each of the plurality of kinds of fonts (typefaces). Note that only the first position is defined in the connection position information 110 for a capital-letter font. Some fonts have letters for which neither the first position nor the second position is defined.

Figure 4:
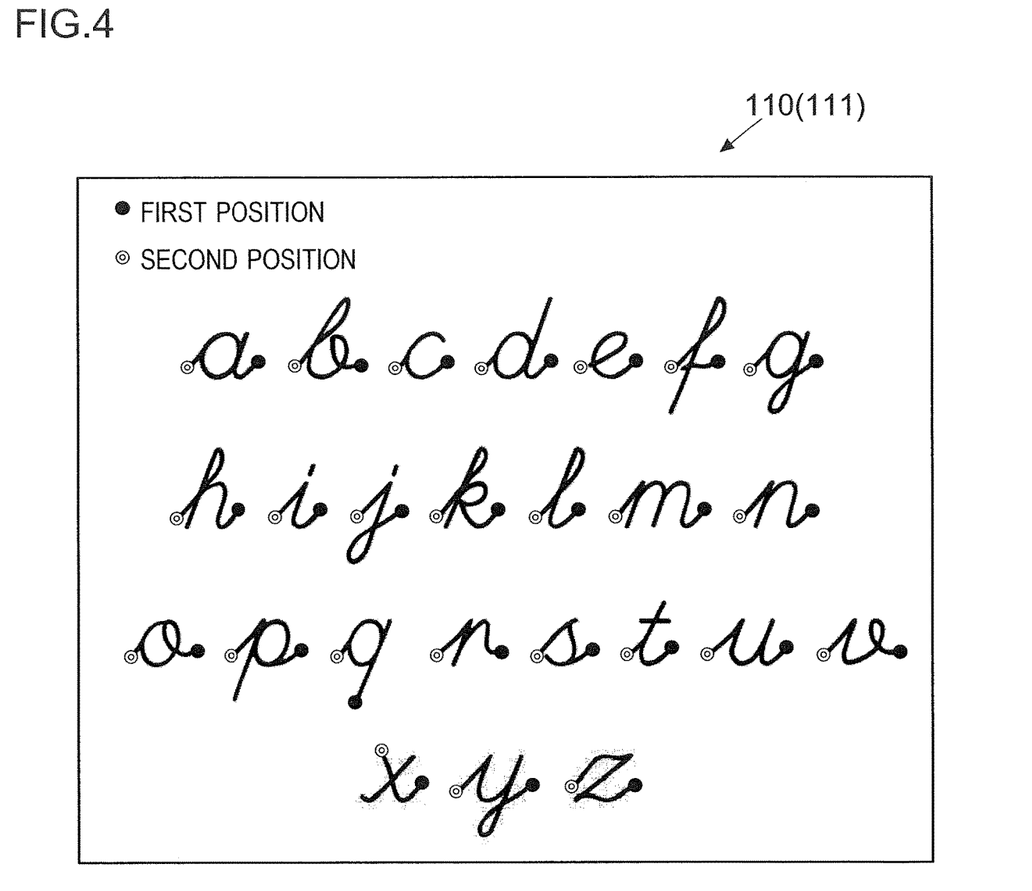
FIG. 4 is a diagram for illustrating connection position information stored in the image processing apparatus according to the first embodiment of the present disclosure.

For example, as shown in FIG. 4, in the connection position information 110 (111) corresponding to a small-letter script font, the second and first positions are defined with respect to each of the plurality of letters (a to z). In FIG. 4, the first position is indicated by a black solid dot, and the second position is indicated by a double circle.

Figure 5:
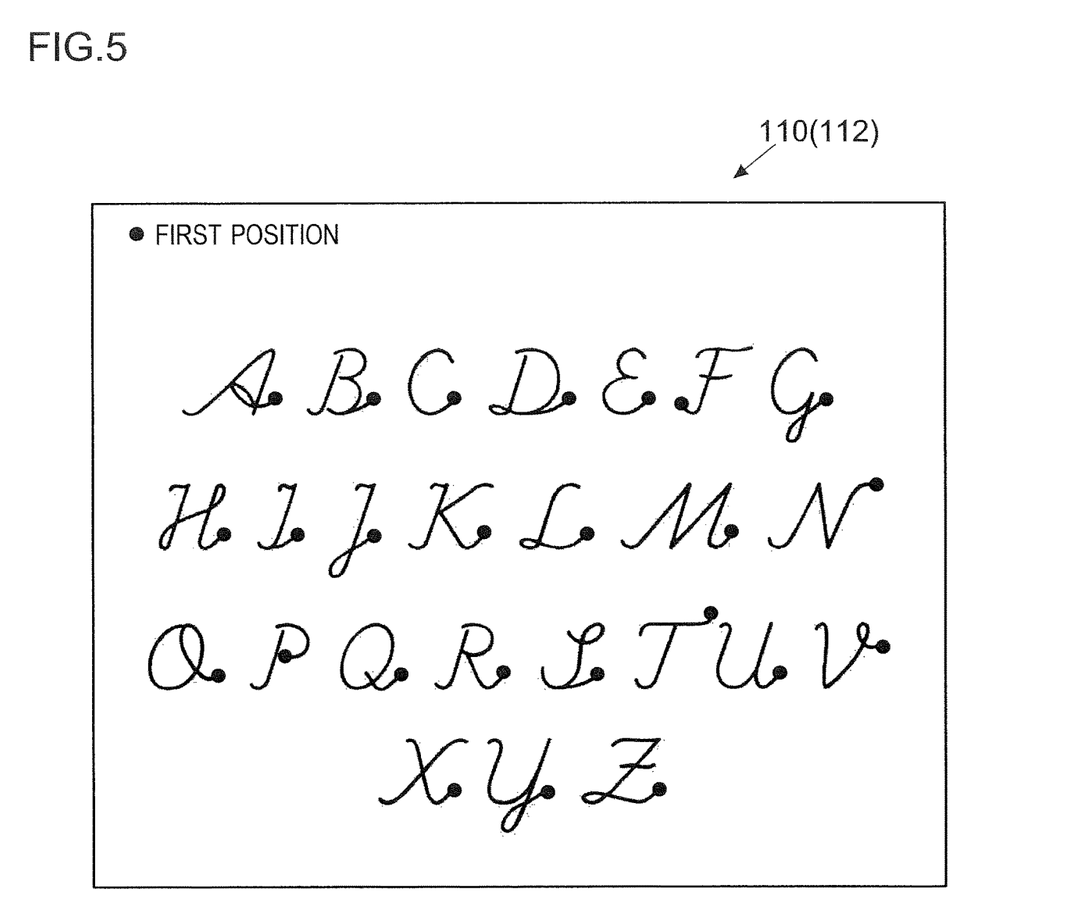
FIG. 5 is a diagram for illustrating the connection position information stored in the image processing apparatus according to the first embodiment of the present disclosure.

As shown in FIG. 5, in the connection position information 110 (112) corresponding to a capital-letter script font, the first position is defined for each of the plurality of letters (A to Z). Note that, since the letters corresponding to the connection-position information 112 are capital letters, no second position is defined. In FIG. 5 the first position is indicated by a black solid dot.

Figure 6:
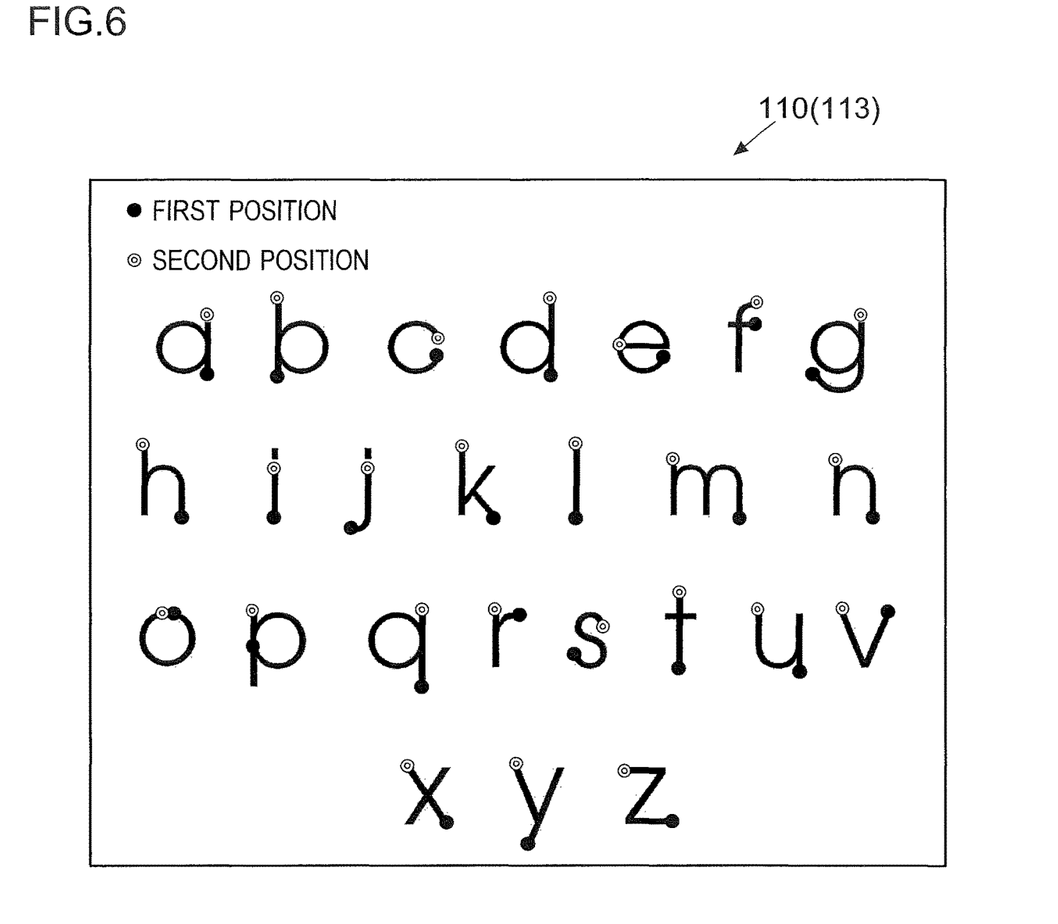
FIG. 6 is a diagram for illustrating the connection position information stored in the image processing apparatus according to the first embodiment of the present disclosure.

As shown in FIG. 6, in the connection position information 110 (113) corresponding to a small-letter sans-serif font, the first and second positions are defined for each of the plurality of letters (a to z). In FIG. 6, the first position is indicated by a black solid dot, and the second position is indicated by a double circle.

Figure 7:
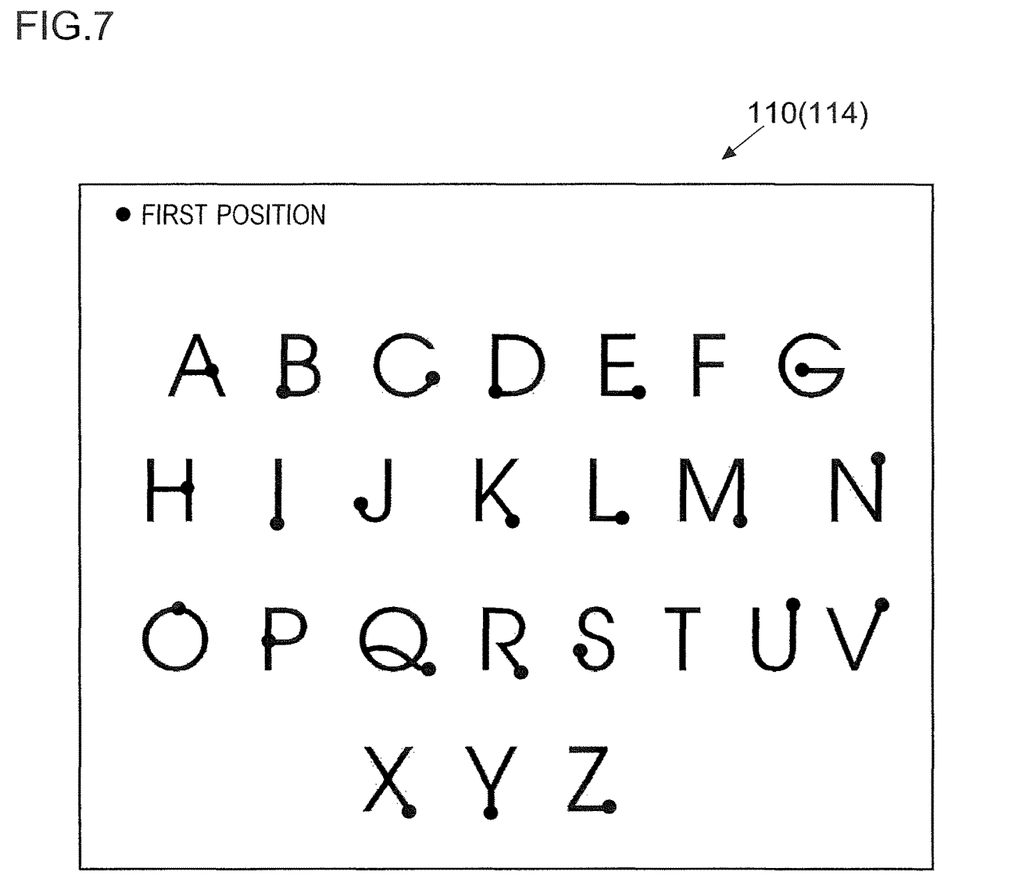
FIG. 7 is a diagram for illustrating the connection position information stored in the image processing apparatus according to the first embodiment of the present disclosure.

As shown in FIG. 7, in the connection position information 110 (114) corresponding to a capital-letter sans-serif font, the first position is defined for each of the plurality of letters (A to Z) excluding letters F and T. Note that it is usual that letters F and T of sans-serif fonts are not connected to other letters (this applies to serif fonts as well). Thus, the first position is not defined for either F or T of the sans-serif font. Further, the letters corresponding to the connection position information 114 are capital letters, and thus the second position is not defined. In FIG. 7 the first position is indicated by a black solid dot.

When performing the connection position setting processing, the PC control portion 11 selects the connection position information 110 corresponding to the font of the target letter (the next letter). Then, based on the selected connection position information 110, the PC control portion 11 sets the first position in the target letter, and sets the second position in the next letter. At this time, the PC control portion 11 recognizes the first position corresponding to a letter of the same kind as the target letter, and sets the recognized first position as the first position in the target letter. Further, the PC control portion 11 recognizes the second position corresponding to a letter of the same kind as the next letter, and sets the recognized second position as the second position in the next letter.

Specifically, when the target letter is letter "a" of the script font, the first position in letter "a" defined in the connection position information 111 is set as the first position in the target letter. When the next letter is letter "b" of the script font, the second position in letter "b" defined in the connection position information 111 is set as the second position in the next letter.

Here, in a case where the data format of the font data for drawing the target letter (the next letter) is a bitmap font format, the PC control portion 11 sets the first and second positions based on the bitmap data (data where a position at which a line forming the letter exists is indicated by "1" and a position at which no line forming the letter exists is indicated by "0") of the target letter (the next letter). In a case where the data format of the font data for drawing the target letter (the next letter) is a scalable font format, the PC control portion 11 sets the first and second positions based on the coordinate data indicating the outline and the center line of the target letter (the next letter).

Figure 3:
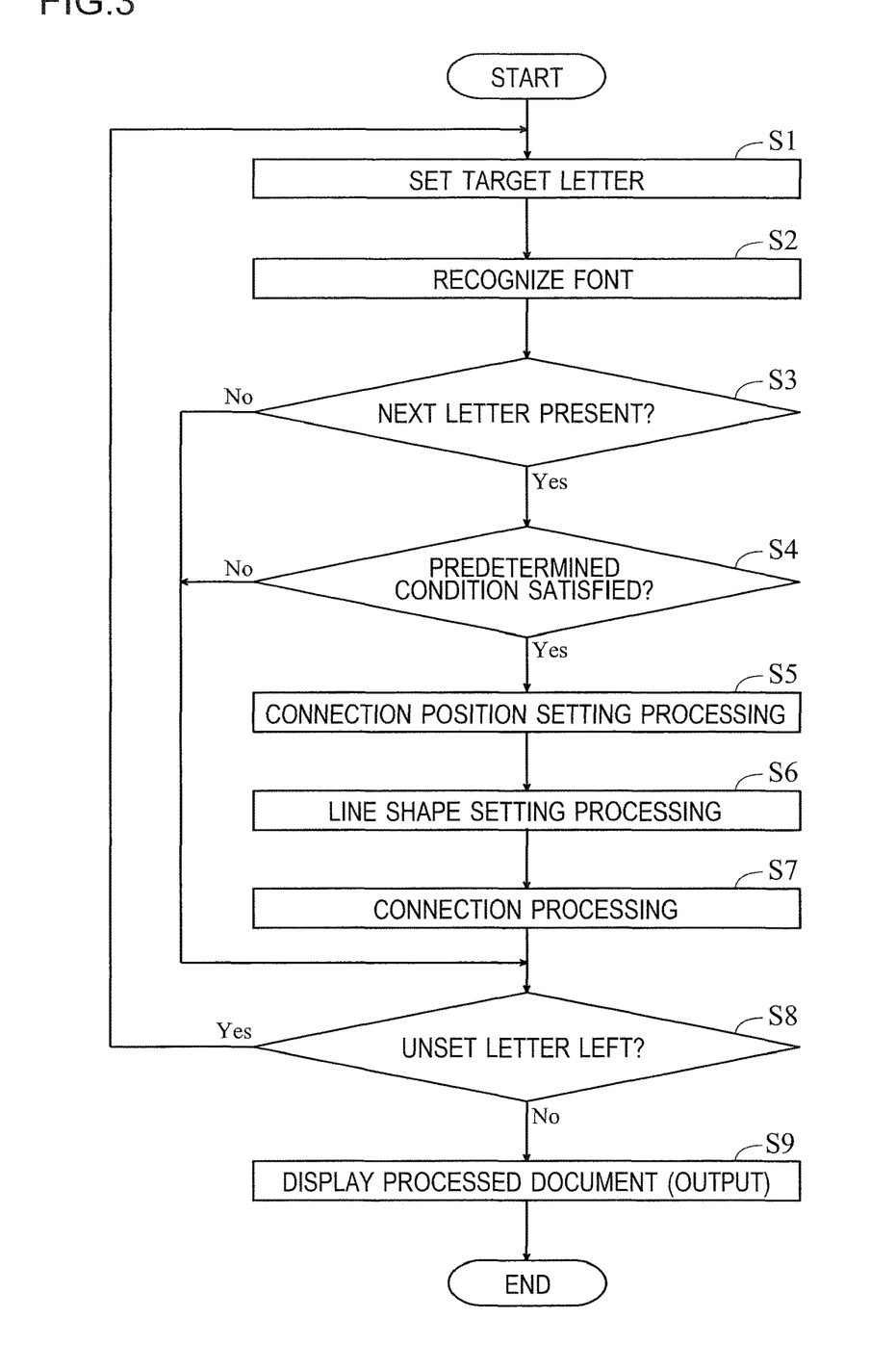
FIG. 3 is a flow chart showing a flow of processing performed by the image processing apparatus according to the first embodiment of the present disclosure.

Back in FIG. 3, after the processing of step S5 is performed, the flow proceeds to step S6. In step S6, the PC control portion 11 performs line shape setting processing. At this time, the PC control portion 11 refers to line shape information 120. The line shape information 120 is stored in the PC storage portion 12 (see FIG. 1).

The line shape information 120 is information that defines the shape of the connection line (the width, the curving extent, etc., of the connection line) for each of the plurality of kinds of fonts (typefaces). The width, the curving extent, etc., of lines forming letters are different from font to font. Thus, the line shape information 120 for each font defines the shape of the connection line based on the width, the curving extent, etc., of lines that form the letters of the corresponding font. For example, the curving extent of the connection line defined by the line shape information 120 corresponding to the script font is larger than that defined by the line shape information 120 corresponding to the serif font (the sans-serif font). Here, since the lines that form the letters of the serif font (the sans-serif font) are straight lines, the connections line defined by the line shape information 120 may be a straight line.

When performing the line shape setting processing, the PC control portion 11 selects the line shape information 120 that corresponds to the font of the target letter (the next letter). Then, based on the selected line shape information 120, the PC control portion 11 sets the shape of the connection line for connecting the target letter and the next letter to each other.

Then, in step S7, the PC control portion 11 performs the connection processing of connecting the target letter and the next letter to each other with the connection line. At this time, the PC control portion 11 uses the connection line having the shape having been set in step S6 to connect the first position (the first position having been set in step S5) of the target letter and the second position (the second position having been set in step S5) of the next letter.

Thereafter, the flow proceeds to step S8. The flow proceeds to step 8 also in a case where the PC control portion 11 has determined in step S4 that the predetermined conditions are not satisfied. The flow proceeds to step S8 also in a case where the PC control portion 11 has determined in step S3 that no next letter exists.

In step S8, the PC control portion 11 determines whether or not there is any letter that has not been set as a target letter yet in the target document. When, as a result, the PC control portion 11 has determined that there is a letter left unset, the flow proceeds to step S1. In this case, the PC control portion 11 sets the unset letter as a new target letter, and performs the processing of step S2 and the processing of the following steps.

When, in step S8, the PC control portion 11 has determined that there is no letter left unset, the flow proceeds to step S9. In step S9, the PC control portion 11 makes the display device 131 output the document having undergone the connection processing (hereinafter referred to as the processed document). That is, the display device 131 displays the processed document. In this configuration, the display device 131 corresponds to "an output portion".

Here, the PC control portion 11 activates the PD 142 when the operation display portion 13 accepts a printing instruction from the user while the processed document is displayed. Then, by using the PC communication portion 14, the PC control portion 11 transmits the processed document (printing data for printing the processed document) to the image forming apparatus 1000. That is, the PC communication portion 14 outputs (transmits) the processed document to the image forming apparatus 1000. With the processed document having been transmitted to the image forming apparatus 1000, the printing of the processed document is executed in the image forming apparatus 1000.

Figure 8:
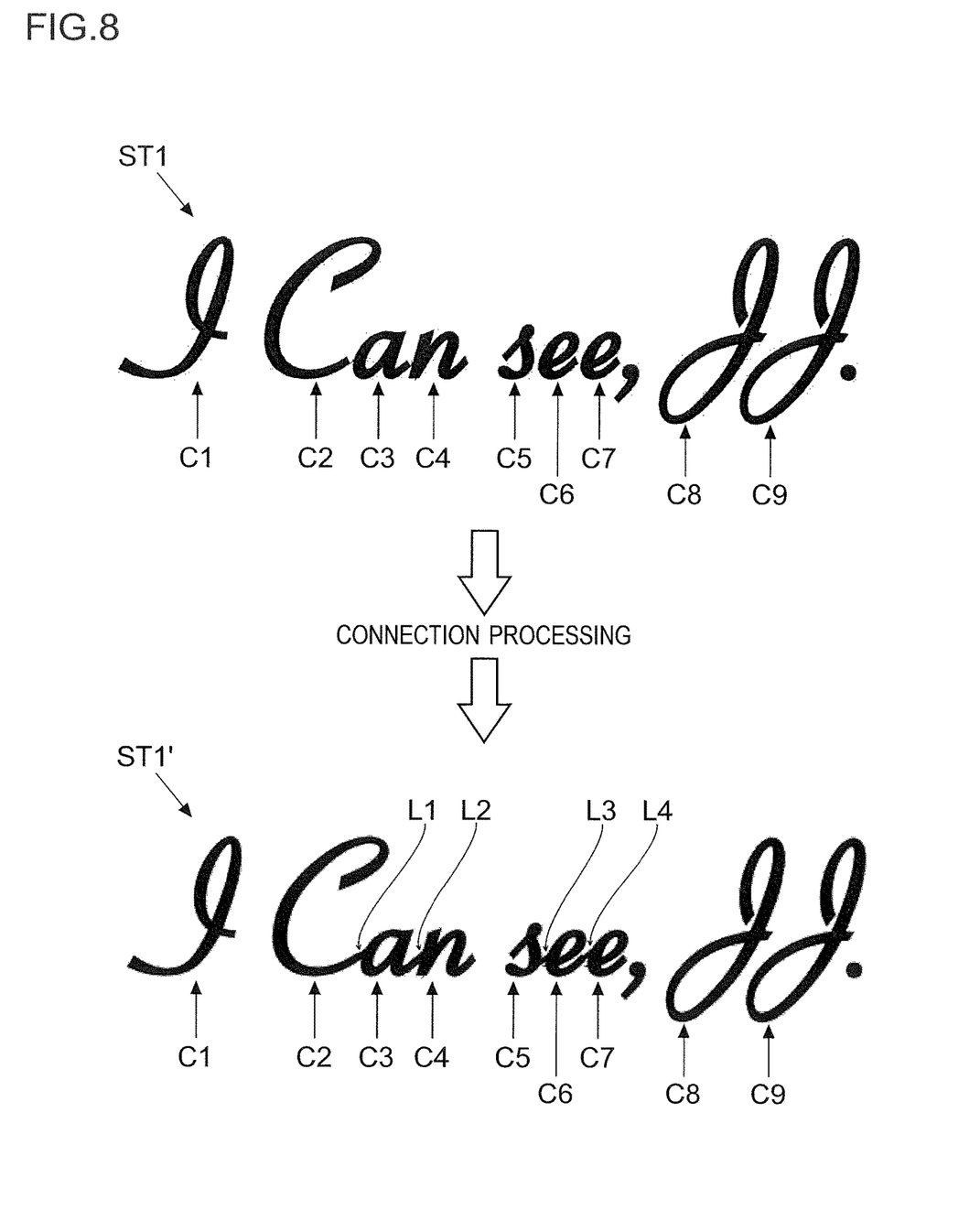
FIG. 8 is a diagram for illustrating the connection processing performed by the image processing apparatus according to the first embodiment of the present disclosure.

Here, by taking, as an example, a script-font letter string ST1 shown in FIG. 8, a detailed description will be given of the connection processing performed by the PC control portion 11. In FIG. 8, the upper diagram shows the letter string ST1 before the connection processing, and the lower diagram shows a letter string ST1' after the connection processing. In the following description, for the sake of convenience, the plurality of letters in the letter string ST1 are respectively indicated by signs C1 to C9.

First, the PC control portion 11 sets, as a target letter, a letter C1, which is the first letter in the letter string ST1 in order of alignment in the writing direction. In this case, a letter C2 is a next letter. Here, the letter C2 is a capital letter. There is a space between the letter C1 and the letter C2. Thus, the PC control portion 11 determines that the predetermined conditions are not satisfied, and does not connect the letters C1 and C2 to each other with a connection line.

Next, the PC control portion 11 sets, as a new target letter, the letter C2, which is the second letter in the letter string ST1 in order of alignment in the writing direction. In this case, a letter C3 is a next letter. Here, the letter C3 is a small letter, and there is neither a separation mark nor a space between the letters C2 and C3. Thus, the PC control portion 11 determines that the predetermined conditions are satisfied, and connects the letters C2 and C3 to each other with a connection line. The connection line is indicated by a reference sign L1.

Next, the PC control portion 11 sets, as a new target letter, the letter C3, which is the third letter in the letter string ST1 in order of alignment in the writing direction. In this case, a letter C4 is a next letter. Here, the letter C4 is a small letter, and there is neither a separation mark nor a space between the letters C3 and C4. Thus, the PC control portion 11 determines that the predetermined conditions are satisfied, and connects the letters C3 and C4 to each other with a connection line. The connection line is indicated by a reference sign L2.

Next, the PC control portion 11 sets, as a new target letter, the letter C4, which is the fourth letter in the letter string ST1 in order of alignment in the writing direction. In this case, a letter C5 is a next letter. Here, the letter C5 is a small letter, but there is a space between the letters C4 and C5. Thus, the PC control portion 11 determines that the predetermined conditions are not satisfied, and does not connect the letters C4 and C5 to each other with a connection line.

Next, the PC control portion 11 sets, as a new target letter, the letter C5, which is the fifth letter in the letter string ST1 in order of alignment in the writing direction. In this case, a letter C6 is a next letter. Here, the letter C6 is a small letter, and there is neither a separation mark nor a space between the letters C5 and C6. Thus, the PC control portion 11 determines that the predetermined conditions are satisfied, and connects the letters C5 and C6 to each other with a connection line. The connection line is indicated by a reference sign L3.

Next, the PC control portion 11 sets, as a new target letter, the letter C6, which is the sixth letter in the letter string ST1 in order of alignment in the writing direction. In this case, a letter C7 is a next letter. Here, the letter C7 is a small letter, and there is neither a separation mark nor a space between the letters C6 and C7. Thus, the PC control portion 11 determines that the predetermined conditions are satisfied, and connects the letters C6 and C7 to each other with a connection line. The connection line is indicated by a reference sign L4.

Next, the PC control portion 11 sets, as a new target letter, the letter C7, which is the seventh letter in the letter string ST1 in order of alignment in the writing direction. In this case, a letter C8 is a next letter. Here, the letter C8 is a capital letter. There is a separation mark and a space between the letter C7 and the letter C8. Thus, the PC control portion 11 determines that the predetermined conditions are not satisfied, and does not connect the letters C7 and C8 to each other with a connection line.

Next, the PC control portion 11 sets, as a new target letter, the letter C8, which is the eighth letter in the letter string ST1 in order of alignment in the writing direction. In this case, a letter C9 is a next letter. Here, there is neither a separation mark nor a space between the letters C8 and C9, but the letter C9 is a capital letter. Thus, the PC control portion 11 determines that the predetermined conditions are not satisfied, and does not connect the letters C8 and C9 to each other with a connection line.

Next, the PC control portion 11 sets, as a new target letter, the letter C9, which is the ninth letter in the letter string ST1 in order of alignment in the writing direction. Here, no letter is positioned immediately after the letter C9 in order of alignment in the writing direction. Thus, at this time point, the connection processing with respect to the letter string ST1 is finished.

Figure 9:
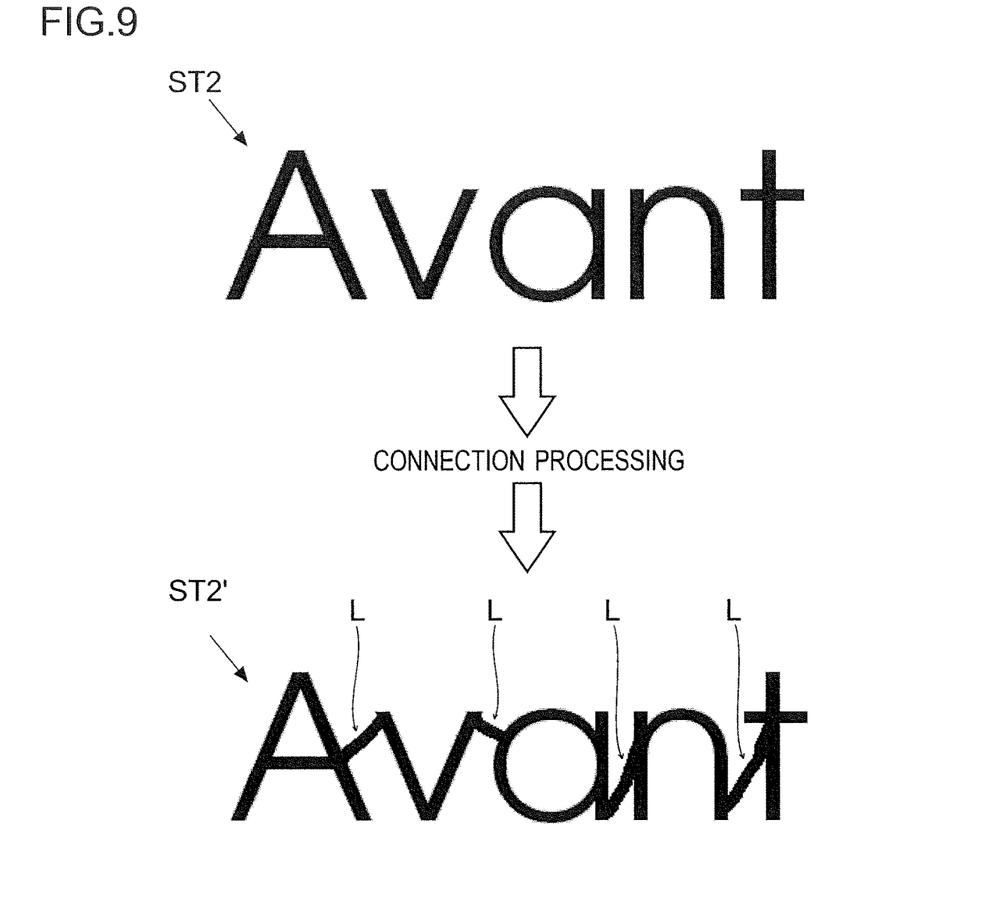
FIG. 9 is a diagram for illustrating the connection processing performed by the image processing apparatus according to the first embodiment of the present disclosure.

As another example, assume that a sans-serif-font letter string ST2 as shown in FIG. 9 is the target of the connection processing. In this case as well, the letters in the letter string ST2 are set as a target letter sequentially one by one. Then, if the predetermined conditions are satisfied, the target letter and the next netter are connected to each other with a connection line. In FIG. 9, the upper diagram shows the letter string ST2 before the connection processing, and the lower diagram shows a letter string ST2' after the connection processing. The connection line is indicated by a reference sign L.

Figure 10:
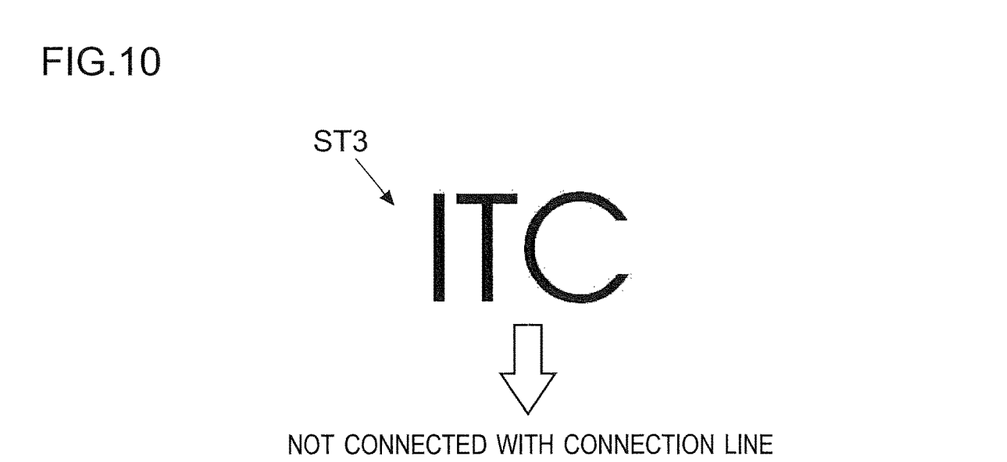
FIG. 10 is a diagram for illustrating the connection processing performed by the image processing apparatus according to the first embodiment of the present disclosure (a diagram showing a string of letters not to be connected to each other with connection lines).

As still another example, assume that a letter string ST3 as shown in FIG. 10 is the target of the connection processing. In this case, whichever of the letters may be the target letter, the predetermined conditions are not satisfied, and thus the letters are not connected to each other with a connection line.

As described above, the PC 100 (an image processing apparatus) of the first embodiment includes the PC control portion 11 (the control portion) which sets a plurality of letters (the alphabetical letters) as a target letter sequentially one by one, and performs the connection processing of connecting the target letter and the next letter to each other with a connection line without changing the font (the typeface) of the target letter and without changing the font of the next letter, and the display device 131 (the output portion) which displays the processed document having undergone the connection processing.

The first embodiment is configured such that the PC control portion 11 executes the connection processing of connecting two adjacent letters (the target letter and the next letter) in a document to each other with a connection line. By connecting two adjacent letters to each other with a connection line, it is possible to change the two letters into handwritten-style letters without changing the fonts of the two letters. This is convenient to a user who wants to change letters in a document into handwritten-style letters without changing the fonts of the letters in the document.

Furthermore, in the first embodiment, as described above, the PC storage portion 12 stores therein the connection position information 110, which defines the first position and the second position with respect to each letter of the plurality of kinds of letters, the first position being a connection position for connecting, to the each letter, a connection line that is connected to a letter positioned immediately after the each letter in order of alignment in the writing direction, the second position being a connection position for connecting, to the each letter, a connection line that is connected to a letter positioned immediately before the each letter in order of alignment in the writing direction. The PC control portion 11, based on the connection position information 110, sets the first position in a target letter and the second position in a next letter, and connects the first position in the target letter and the second position in the next letter to each other with a connection line. With this configuration, it is possible to connect the connection line to the target letter at a position (a position near the position at which the writing of the target letter ends) suitable in terms of the order of strokes in writing the target letter, and also to connect the connection line to the next letter at a position (a position near the position at which the writing of the next letter starts) suitable in terms of the order of strokes in writing the next letter. This contributes to improving the appearance of the letters after the connection processing.

Moreover, in the first embodiment, as described above, the PC storage portion 12 stores therein the connection position information 110 for each of a plurality of kinds of fonts. The PC control portion 11 sets the first position in a target letter and the second position in a next letter based on the connection position information 110 corresponding to the font of the target letter. This contributes to further improving the appearance of letters after the connection processing regardless of the fonts of the letters.

In addition, in the first embodiment, as described above, the PC storage portion 12 stores therein the line shape information 120 which defines the shape of the connection line (the width, the curving extent, etc., of the connection line) for each of the plurality of kinds of fonts. The PC control portion 11 recognizes the shape of the connection line corresponding to the font of the target letter based on the line shape information 120 corresponding to the font of the target letter, and connects the target letter and the next letter to each other with a connection line having the recognized shape. Here, the width, the curving extent, etc., of lines forming letters are different from font to font of the letters. Thus, it is preferable to prepare the line shape information 120 for each of the plurality of kinds of fonts, and to connect a target letter and a next letter to each other with a connection line having the shape corresponding to the font of the target letter (the next letter). This contributes to further improving the appearance of the letters after the connection processing.

Furthermore, in the first embodiment, as described above, the PC control portion 11 does not connect a target letter and a next letter to each other with a connection line when the next letter is a capital letter. Further, the PC control portion 11 does not connect the target letter and the next letter to each other with a connection line when there is a mark that indicates separation between words or a space between a target letter and a next letter. With this configuration, it is possible to reduce cases where letters that are normally unconnected to each other in ordinary writing are connected to each other.

Here, as a modified example of the first embodiment, the PD 142, instead of the DS 141, may be provided with the letter connecting function.

When the operation display portion 13 accepts a printing instruction from the user while a document (one that has not undergone the connection processing yet) created by the user is displayed, the PC control portion 11 activates the PD 142, and makes the operation display portion 13 display a printing setting screen (not shown). On the printing setting screen, it is possible to make settings of the number of copies, the sheet size, etc., and in addition, it is possible to make a setting to the effect that the letter connecting function should be enabled.

When a setting is made on the printing setting screen to the effect that the letter connecting function should be enabled, the PC control portion 11 performs the processing of steps S1 to S8 in the flow chart shown in FIG. 3, and generates printing data for printing a processed document. Then, by using the PC communication portion 14, the PC control portion 11 transmits the processed document (printing data for printing the processed document) to the image forming apparatus 1000. That is, the PC communication portion 14 outputs (transmits) the processed document to the image forming apparatus 1000. In this configuration, the communication portion 14 corresponds to "the output portion". With the processed document transmitted to the image forming apparatus 1000, the printing of the processed document is executed in the image forming apparatus 1000.

Second Embodiment

Hereinafter, a second embodiment of the present disclosure will be described. The image processing apparatus of the second embodiment is an image forming apparatus. There is no particular limitation on the type of the image forming apparatus as the image processing apparatus, and it may be a printer or it may be a multifunction peripheral. In the following description, it is assumed that the image forming apparatus is a printer.

Figure 11:
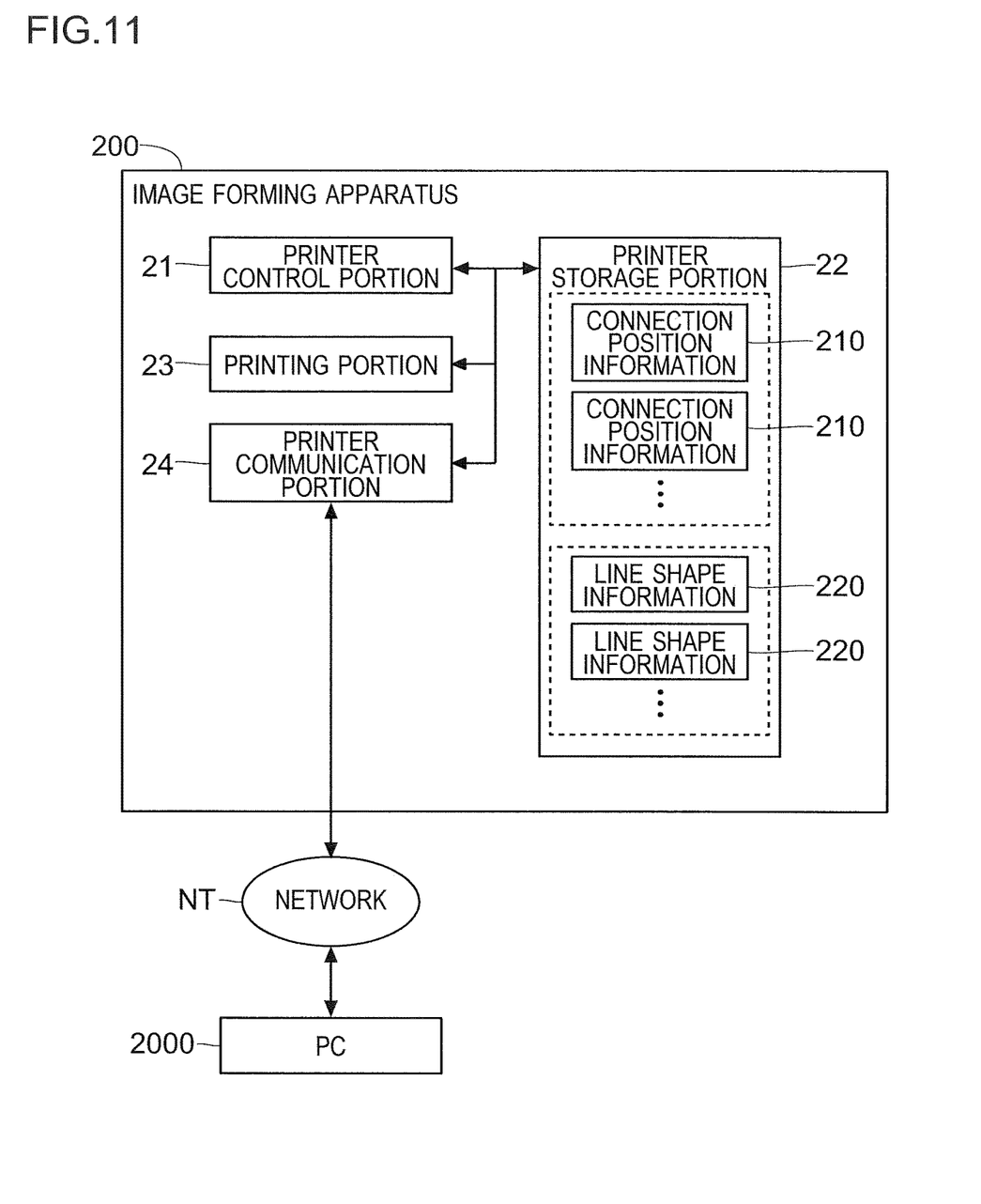
FIG. 11 is a block diagram showing a configuration of an image processing apparatus (an image forming apparatus) according to a second embodiment of the present disclosure.

As shown in FIG. 11, an image forming apparatus 200 according to the second embodiment includes a printer control portion 21, a printer storage portion 22, a printing portion 23, and a printer communication portion 24. In the second embodiment, the printer control portion 21 corresponds to "the control portion", and the printer storage portion 22 corresponds to "the storage portion".

The printer control portion 21 includes a CPU. The printer control portion 21 performs the overall control of the image forming apparatus 200 based on a control program and control data.

The printer storage portion 22 includes storage devices such as a ROM, a RAM, and an HDD. The printer storage portion 22 stores therein the control program and the control data. The printer storage portion 22 is connected to the printer control portion 21. The printer control portion 21 writes information to, and reads information from, the printer storage portion 22.

The printing portion 23 conveys a sheet and prints an image on the sheet under conveyance. The printing portion 23 may employ an inkjet method, or may employ a laser method, as its printing method.

In a case where the printing method of the printing portion 23 is the inkjet method, the printing portion 23 includes an ink head. The printing portion 23 employing the inkjet method ejects ink to the sheet under conveyance such that the ink adheres to the sheet.

In a case where the printing method of the printing portion 23 is the laser method, the printing portion 23 includes a photosensitive drum, a charging device, a developing device, an exposure device, and a transfer roller. The printing portion 23 employing the laser method develops an electrostatic latent image corresponding to an image to be printed into a toner image, and transfers the toner image onto the sheet under conveyance.

The printer communication portion 24 is an interface for connecting the image forming apparatus 200 to the network NT such as a LAN, the Internet, etc. The printer communication portion 24 includes a communication circuit, a communication memory, a communication connector, etc. The network NT has connected thereto, for example, a PC 2000 which is used by the user of the image forming apparatus 200.

The printer communication portion 24 is connected to the printer control portion 21. The printer control portion 21 obtains access to the network NT by using the printer communication portion 24 to communicate with the PC 2000. Note that the PC 2000 has installed therein a printer driver, which is necessary to use the image forming apparatus 200. Consequently, it is possible to transmit, from the PC 2000 to the image forming apparatus 200, printing data for printing a document created on the PC 2000 (a document created by using document creation software, such as word processing software), and thus it is possible to make the image forming apparatus 200 execute the printing of the document.

Here, the image forming apparatus 200 is provided with a function (hereinafter referred to as the letter connecting function) of converting letters included in the document (the document created on the PC 2000) received from the PC 2000 into handwritten-style letters. The letter connecting function of the second embodiment is similar to that of the first embodiment. That is, by using the letter connecting function of the image forming apparatus 200, it is possible to connect two adjacent letters in the document with a line (hereinafter referred to as a connection line) without changing the fonts (the typefaces) of the letters in the document.

For example, on receiving a document printing instruction from the user, the PC 2000 activates the printer driver and displays a printing setting screen (not shown). On the printing setting screen, it is possible to make settings of the number of copies, the sheet size, etc., and further, it is also possible to make a setting to the effect that the letter connecting function of the image forming apparatus 200 should be enabled. When the setting is made to the effect that the letter connecting function of the image forming apparatus 200 should be enabled, a function enabling request is transmitted, together with the document printing data, from the PC 2000 to the image forming apparatus 200.

When the printer communication portion 24 receives the function enabling request together with the document printing data, the printer control portion 21 determines that a request for executing processing (hereinafter referred to as the connection processing) related to the letter connecting function has been accepted. Then, the printer control portion 21 performs the connection processing with respect to letters in the document corresponding to the printing data that the printer communication portion 24 have received together with the function enabling request.

Here, in the second embodiment, as in the first embodiment, alphabetical letters are taken as the target of the connection processing, but non-alphabetical letters are not taken as the target of the connection processing.

Figure 12:
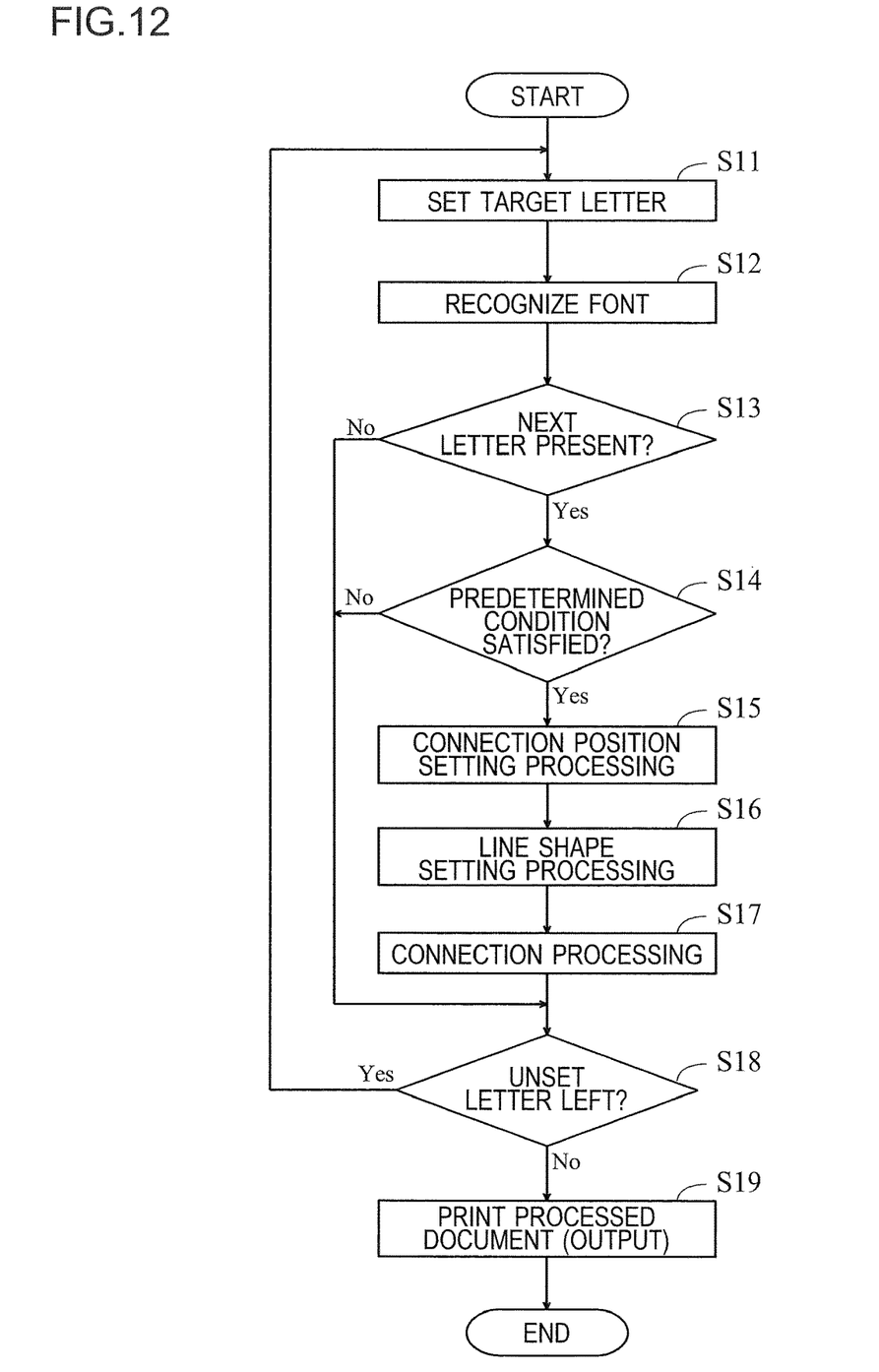
FIG. 12 is a flow chart showing a flow of processing performed by the image processing apparatus according to the second embodiment of the present disclosure.

Hereinafter, with reference to the flow chart shown in FIG. 12, a description will be given of the flow of the processing performed by the printer control portion 21. In the flow chart shown in FIG. 12, the flow starts when the printer control portion 21 has determined that the function enabling request has been received together with the document printing data.

In the following description, a document (a document having been received together with the function enabling request) that includes letters to be the target of the connection processing performed by the printer control portion 21 will be referred to as the target document. Here, assume that the target document includes a plurality of letters, of which all are alphabetical letters.

When the printer communication portion 24 has received the function enabling request together with the document printing data, the printer control portion 21 performs the processing of steps S11 to S18. Here, the processing of steps S11 to S18 is the same as the processing of steps S1 to S8 in the flow chart shown in FIG. 3. Accordingly, the description of the processing of S1 to S8 in the flow chart shown in FIG. 3 is applicable to the processing of steps S11 to S18, and thus the description of the processing of steps S11 to S18 will not be repeated.

Here, to make the printer control portion 21 perform connection position setting processing in step S15 (processing similar to the connection position setting processing performed in step S5 shown in FIG. 3), connection position information 210 is stored in the printer storage portion 22 (see FIG. 11). The connection position information 210 of the second embodiment is information similar to the connection position information 110 of the first embodiment. Accordingly, the description of the connection position information 110 of the first embodiment is applicable to the connection position information 210 of the second embodiment, and thus the description of the connection position information 210 will not be repeated.

Further, to make the printer control portion 21 perform line shape setting processing in step S16 (processing similar to the line shape setting processing performed in step S6 shown in FIG. 3), line shape information 220 is stored in the printer storage portion 22 (see FIG. 11). The line shape information 220 of the second embodiment is information similar to the line shape information 120 of the first embodiment. Accordingly, the description of the line shape information 120 of the first embodiment is applicable to the line shape information 220 of the second embodiment, and thus the description of the line shape information 220 will not be repeated.

When, in step S18, the printer control portion 21 has determined that there is no letter left unset, the flow proceeds to step S19. In step S19, the printer control portion 21 generates printing data for printing the target document having undergone the connection processing (hereinafter referred to as the processed document). Then, the printer control portion 21 makes the printing portion 23 output the processed document. That is, the printing portion 23 prints the processed document on the sheet (in other words, prints an image based on the printing data of the processed document on the sheet, and discharges the printed sheet). In this configuration, the printing portion 23 corresponds to "the output portion".

As described above, the image forming apparatus 200 (the image processing apparatus) of the second embodiment includes the printer control portion 21 (the control portion) which performs the connection processing of sequentially setting a plurality of letters (alphabetical letters) included in the document corresponding to the printing data received from the PC 2000 as a target letter one by one and connecting the target letter and the next letter to each other with a connection line without changing the font (the typeface) of the target letter and without changing the font of the next letter, and the printing portion 23 (the output portion) which prints a processed document having undergone the connection processing.

The second embodiment is configured such that the printer control portion 21 executes the connection processing of connecting two adjacent letters (a target letter and a next letter) in a document to each other with a connection line. By connecting two adjacent letters to each other with a connection line, it is possible to change the two letters into handwritten-style letters without changing the fonts of the two letters. This is convenient to a user who wants to change letters in a document into handwritten-style letters without changing the fonts of the letters in the document.

Furthermore, in the second embodiment, as described above, the connection position information 210 and the line shape information 220 are stored in the printer storage portion 22. The printer control portion 21 sets a first position in a target letter and a second position in a next letter based on the connection position information 210, and also sets the shape of a connection line based on the line shape information 220. With this configuration, as in the first embodiment, it is possible to obtain the effect of improving the appearance of letters after the connection processing.

Other advantages of the second embodiment are similar to those of the first embodiment.

It should be understood that the embodiments disclosed herein are merely illustrative in all respects, and should not be interpreted restrictively. The range of the present disclosure is shown not by the above descriptions of embodiments but the scope of claims for patent, and it is intended that all modifications within the meaning and range equivalent to the scope of claims for patent are included.

What is claimed is:

1. An image processing apparatus comprising:
a control portion which sets a letter included in a document as a target letter, and performs, based on connection position information, connection processing of connecting the target letter and a next letter to each other with a connection line without changing a font of the target letter and without changing a font of the next letter, the next letter being a letter positioned immediately after the target letter in order of alignment in a writing direction;
an output portion which outputs the document after the connection processing is performed on the document; and
a storage portion,
wherein
the storage portion stores therein, as the connection position information, information which defines a first position and a second position with respect to each letter of a plurality of kinds of letters, the first position being a connection position for connecting, to the each letter, the connection line that is connected to a letter positioned immediately after the each letter in order of alignment in the writing direction, the second position being a connection position for connecting, to the each letter, the connection line that is connected to a letter positioned immediately before the each letter in order of alignment in the writing direction,
the storage portion stores therein, for each of a plurality of kinds of fonts, the connection position information corresponding to capital letters and the connection position information corresponding to small letters, and
the control portion
recognizes a font of the target letter out of a serif font, a sans-serif font, and a script font,
sets the first position in the target letter and the second position in the next letter based on the connection position information corresponding to the font of the target letter, and
connects the first position in the target letter and the second position in the next letter to each other with the connection line.

2. The image processing apparatus according to claim 1, further comprising:
a storage portion which stores therein line shape information which defines a shape of the connection line for each of a plurality of kinds of fonts,
wherein
based on the line shape information corresponding to a font of the target letter, the control portion recognizes the shape of the connection line corresponding to the font of the target letter, and connects the target letter and the next letter to each other with the connection line having the recognized shape.

3. The image processing apparatus according to claim 1, wherein
the control portion performs the connection processing on alphabetical letters, and when the next letter is a capital letter, the control portion does not connect the target letter and the next letter to each other with the connection line.

4. The image processing apparatus according to claim 1, wherein
the control portion does not connect the target letter and the next letter to each other with the connection line when there is a mark for indicating separation between words or a space between the target letter and the next letter.

5. A method for controlling an image processing apparatus, the method comprising:

setting a letter included in a document as a target letter and performing, based on connection position information stored in a storage portion, connection processing of connecting the target letter and a next letter to each other with a connection line without changing a font of the target letter and without changing a font of the next letter, the next letter being a letter positioned immediately after the target letter in order of alignment in a writing direction; and outputting the document after the connection processing is performed on the document wherein the storage portion stores therein, as the connection position information, information which defines a first position and a second position with respect to each letter of a plurality of kinds of letters, the first position being a connection position for connecting, to the each letter, the connection line that is connected to a letter positioned immediately after the each letter in order of alignment in the writing direction, the second position being a connection position for connecting, to the each letter, the connection line that is connected to a letter positioned immediately before the each letter in order of alignment in the writing direction, the storage portion stores therein, for each of a plurality of kinds of fonts, the connection position information corresponding to capital letters and the connection position information corresponding to small letters, and the performing of the connection processing includes recognizing a font of the target letter out of a serif font, a sans-serif font, and a script font, setting the first position in the target letter and the second position in the next letter based on the connection position information corresponding to the font of the target letter, and connecting the first position in the target letter and the second position in the next letter to each other with the connection line.

* * * * *